(12) United States Patent
Rasekhi

(10) Patent No.: US 8,770,607 B2
(45) Date of Patent: Jul. 8, 2014

(54) EMBARKING AND/OR DISEMBARKING EXTENSION HAVING BRAKING MEANS

(75) Inventor: Abbas Rasekhi, Kassel (DE)

(73) Assignee: Gebr. Bode GmbH & Co. KG (DE)

( * ) Notice: Subject to any disclaimer, the term of this patent is extended or adjusted under 35 U.S.C. 154(b) by 0 days.

(21) Appl. No.: 13/992,516

(22) PCT Filed: Dec. 8, 2010

(86) PCT No.: PCT/EP2010/069190
§ 371 (c)(1),
(2), (4) Date: Jul. 15, 2013

(87) PCT Pub. No.: WO2012/076048
PCT Pub. Date: Jun. 14, 2012

(65) Prior Publication Data
US 2013/0277938 A1 Oct. 24, 2013

(51) Int. Cl.
*B60R 3/00* (2006.01)

(52) U.S. Cl.
USPC .................................. 280/166; 280/163

(58) Field of Classification Search
USPC .................................. 280/163–169
See application file for complete search history.

(56) References Cited

U.S. PATENT DOCUMENTS

| 4,116,457 A | * | 9/1978 | Nerem et al. | 280/166 |
| 5,085,450 A | * | 2/1992 | DeHart, Sr. | 280/166 |
| 5,224,722 A | * | 7/1993 | Kempf | 280/166 |
| 6,746,033 B1 | * | 6/2004 | McDaniel | 280/166 |
| 7,857,337 B2 | * | 12/2010 | Ferguson et al. | 280/166 |

FOREIGN PATENT DOCUMENTS

EP 1386818 A1 2/2004

OTHER PUBLICATIONS

ISR PCT/EP2010/069190 dated Aug. 31, 2011.

* cited by examiner

*Primary Examiner* — John Walters
*Assistant Examiner* — James Triggs
(74) *Attorney, Agent, or Firm* — Cantor Colburn LLP

(57) ABSTRACT

The invention relates to an embarking/disembarking device (1) for a vehicle. The embarking/disembarking device has an extension (2) that can be moved back and forth between a retracted position and an extended position, a driven carrier (4), which carries along the extension, a motor and an associated transmission (3) in order to drive the carrier (4), braking means (5) in order to at least brake the extension (2), wherein the embarking/disembarking device is characterized in that the extension (2) is supported so as to be movable relative to the carrier (4), and the braking means (5) are moved at least from the released position thereof to the braking position thereof by the relative motion between the extension (2) and the carrier (4).

11 Claims, 2 Drawing Sheets

EMBARKING AND/OR DISEMBARKING EXTENSION HAVING BRAKING MEANS

FIELD

The disclosure relates to an embarking and/or disembarking device for a vehicle, in particular for a passenger-carrying vehicle as used in public transport.

BACKGROUND

Embarking/disembarking devices often have an extension, in the case of a linear displacement what is known as a sliding step, which can be moved back and forth between a retracted and an extended position and for example in an extended position defines a region which can be walked or driven on. These sliding steps often have lateral guides of the extension for fastening to a carriage body or vehicle frame of the vehicle.

Extensions are used in order to help persons to enter and exit a passenger-carrying vehicle by bridging the gap between the vehicle and the embarking/disembarking platform edge, such as the railway platform edge. However, there are problems if the horizontal gap width varies, if there are obstacles there and if forces act on the extension counter to its extension direction. In the extended position, there is the problem that external forces cause the extension to become misaligned. Although the gearing mechanism driving the extension can be made self-limiting, such a force effect can easily result in destruction of the gearing mechanism. In particular, the belt drives, which are desirable owing to their small volume and quiet operation, are particularly susceptible, as such stress can result in longitudinal stretching of the belt. Furthermore, braking of the extension during its movement is desirable as, owing to the desirably high extension and retraction speed, the impact of the extension against an obstacle can result in damage, in particular personal injury.

SUMMARY

Against the background of these disadvantages, an embarking/disembarking device having a mechanical braking means of simple design is provided.

The above is achieved by an embarking/disembarking device and by a passenger-carrying vehicle. Advantageous configurations in each case form the subject matter of the disclosure. It should be pointed out that the features disclosed individually herein can be combined with each other in any technologically sensible manner and reveal further configurations. The description, in particular in connection with the figures, characterises and specifies the disclosure additionally.

The disclosure relates to an embarking/disembarking device for a vehicle, in particular for a passenger-carrying vehicle, for example a public transport vehicle. The embarking/disembarking device according to the disclosure has an extension, for example what is known as a sliding step, which can be moved back and forth between a retracted and an extended position. For example, lateral guides of the extension are provided on its narrow sides for fastening to a vehicle, for example the carriage body. For example, rollers which are guided in rails on the carriage body side are mounted on the extension. Furthermore, a frame or housing can be provided, by means of which the guides are fastened to the vehicle. Generic sliding steps are known for example from EP 1923267 A1. The disclosure is not limited in terms of the configuration of the sliding step, the design of the associated walking region and the configuration of the guide.

According to the disclosure, it is provided for the extension to be carried along by a carrier. To drive the carrier, a motor and an associated gearing mechanism are also provided. The disclosure is not limited in terms of the motor and the gearing mechanism. It is desirably an electric motor, a hydraulic motor or a pneumatic motor.

According to the disclosure, a braking means is also provided in order to at least brake the extension, "at least" meaning that blocking of the extension can also be provided according to the disclosure. The device according to the disclosure is characterised in that the extension is mounted on the carrier in a relatively movable manner, and the braking means are moved at least out of their release position into their braking position owing to the relative movement between the extension and the carrier. The extension is thereby braked in its movement and largely fixed in its position. A force effect, in particular with a component parallel to the movement direction of the extension, at least largely prevents misalignment of the extension in its position and then excessive loading of the motor and gearing mechanism. The drive components are thus protected. During an extension movement, the extension is thus braked and personal injury or damage to the extension is prevented.

In order to ensure reliable release of the braking means, it is provided according to a desirable configuration for the braking means to be moved into their release position by means of a restoring force.

According to a further desirable configuration, it is provided for the relative movement of extension and carrier to be configured in such a manner that a central release position and two braking positions, which correspond to the two movement directions of the relative movement between extension and carrier, are provided. Braking of the extension is then provided for both force directions.

In order to save installation space for the drive and reduce operating noise, the gearing mechanism is desirably at least partially a form-fitting or force-fitting belt or chain drive. It is desirably a form-fitting belt or chain drive, such as a toothed belt drive.

The carrier is then desirably fastened to a belt of the belt drive.

According to an exemplary configuration, the braking means comprise a pivotable cam disc which has one or a plurality of cams and interacts with the carrier to generate a braking force. For example, the cam generates a braking force by acting on a guide. Even more desirably, the cam disc when in its braking position causes the carrier to wedge in its guide.

To increase the braking effect, the braking means interact with a friction face. Friction face within the meaning of the disclosure is defined as a surface which is changed in terms of surface properties compared to a smooth surface in such a manner that a increased adhesion and/or sliding resistance is produced between the braking means and the face in question, for example by means of changes in shape from the 1st to the 4th order.

According to a further configuration, it is provided for the position of the braking means to be detected by means of an optical, magnetic or electromagnetic sensor. The detection signal generated thereby is for example fed to an electronic control unit. For example, the said control unit generates an alarm signal.

The disclosure further relates to a passenger-carrying vehicle which has the advantageous, above-mentioned embarking/disembarking device.

BRIEF DESCRIPTION OF THE FIGURES

The disclosure and the technical context are explained in more detail below using the figures. It should be pointed out that the figures show an exemplary variant of the disclosure, but the disclosure is not limited to this. In the figures.

DETAILED DESCRIPTION

Figure 1:
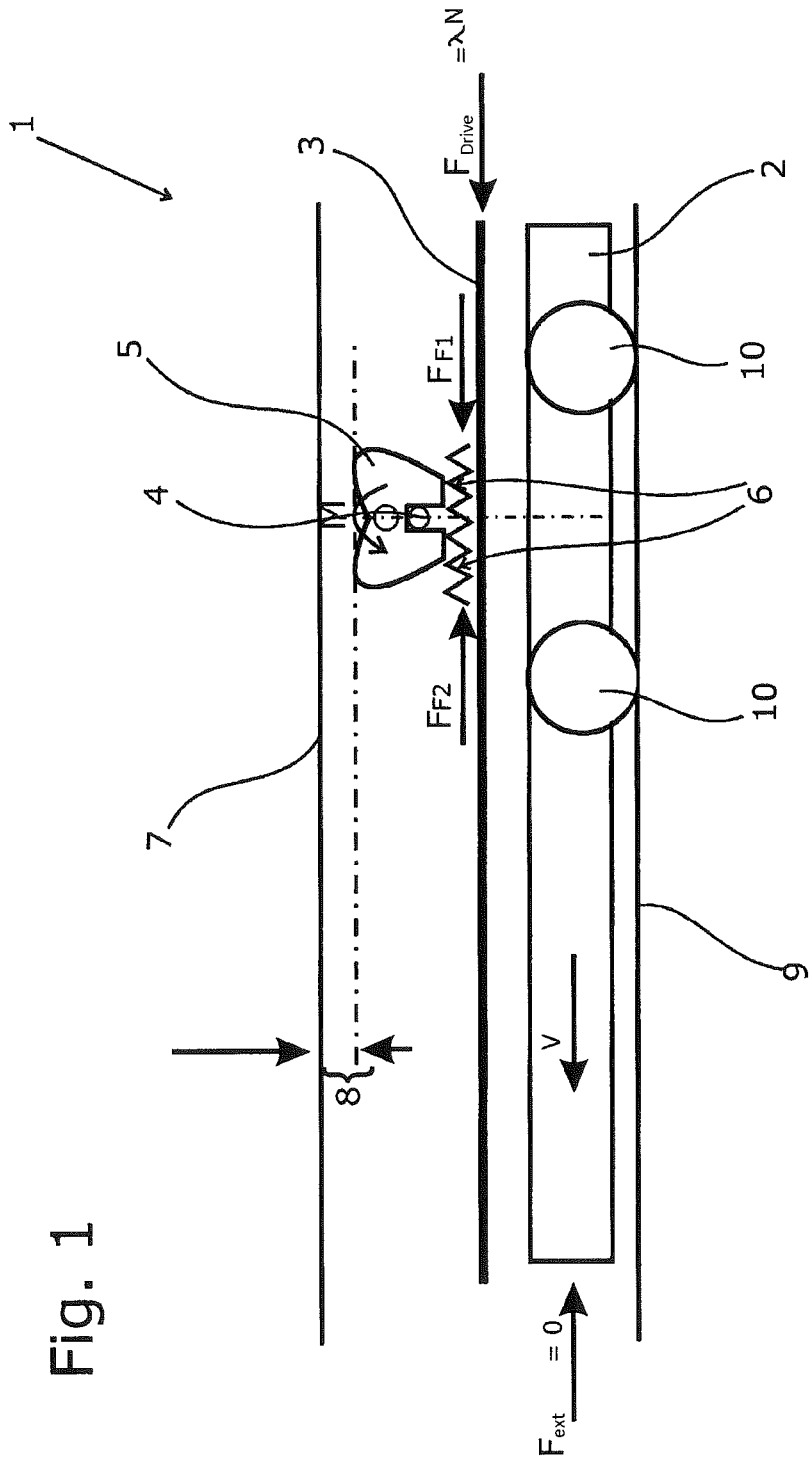
FIG. 1: schematically shows a schematic side view of the embarking/disembarking device, in which the extension 2 is not braked.
Figure 2:
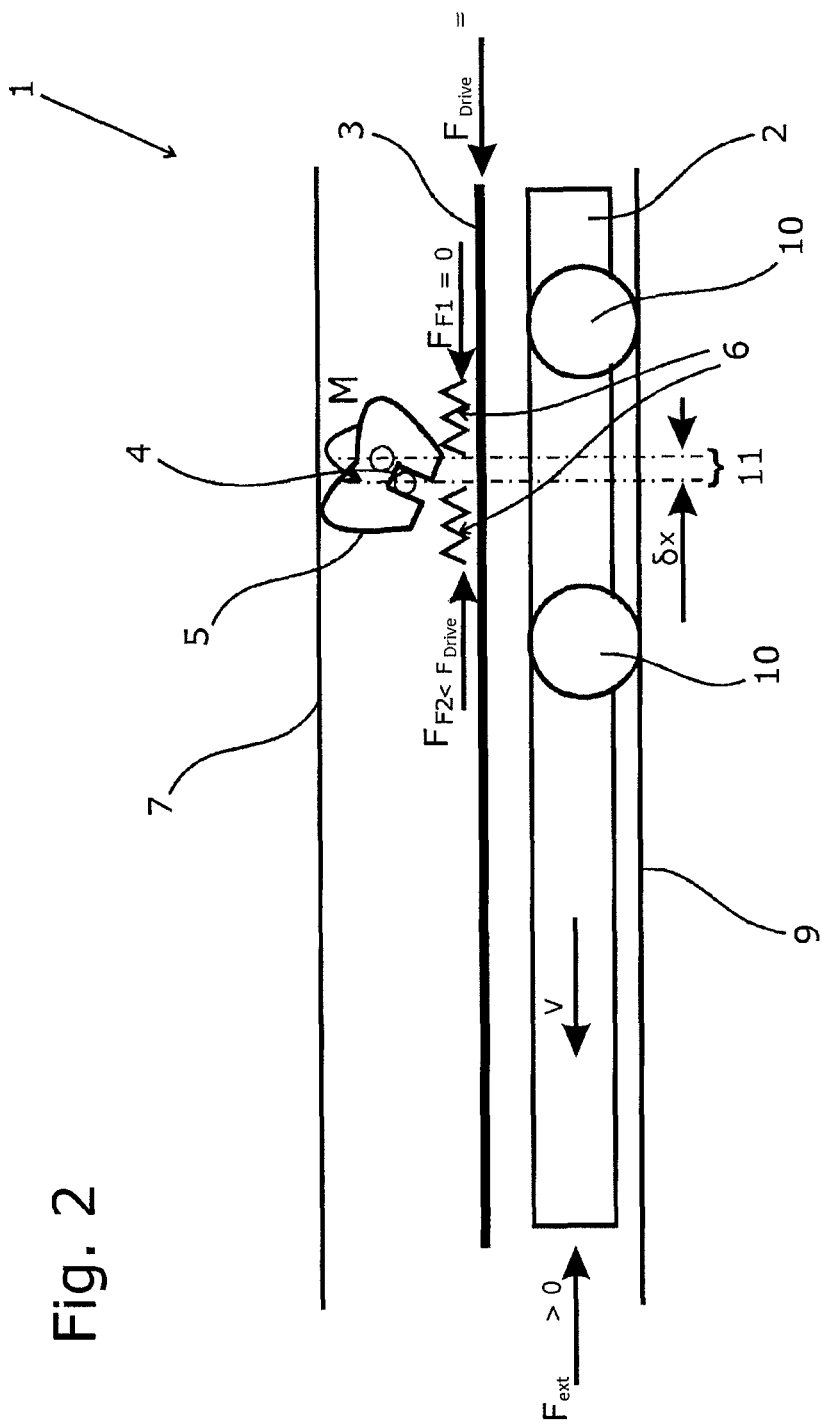
FIG. 2: schematically shows a schematic side view of the embarking/disembarking device, in which the extension 2 is braked or blocked.

The embarking/disembarking device 1 according to the disclosure comprises an extension 2, i.e. a linearly guided sliding step. This extension 2 is guided on both sides of the extension 2, which are parallel to the extension direction, by means of the rollers 10 in an indicated guide 9, which for its part is fastened to a vehicle frame (not shown). The extension is drive by means of a motor (not shown) and a belt drive, which comprises a circulating toothed belt 3. A carrier 4 is fastened to the toothed belt 3. The movement of the toothed belt 3 is transmitted to the extension 2 by means of the carrier 4, in order to move the said extension back and forth between its retracted position and its extended position. A relative movement is provided between the carrier 4 and the extension 2. This is made possible in that the carrier engages in a cam disc 5 which is mounted in a pivotable manner on the extension 2. The movement of the cam disc is limited and thereby defines the maximum displacement distance between the extension 2 and the carrier 4. Springs 6 are provided in order to hold the cam disc 5 in its central position as shown in FIG. 1 or to return it to this position if there is no external force effect on the extension 2, as shown in FIG. 1. When the cam disc 5 is in the said central position, it does not have a braking effect. When an external force $F_{ext}$ is effective, as shown in FIG. 2, there is a relative movement between the carrier 4 and the extension 2 by the distance 11. This causes pivoting of the cam disc 5, which covers a braking stroke 8 with one of its cams and is pressed against a friction face 7 of the frame with a pressure corresponding to the external force $F_{ext}$. A braking effect is produced, which brakes the extension in its extension movement or inhibits or prevents the extension 2 from being pushed back counter to the extension direction. Owing to the pivotability of the cam disc 5 from the central position (released position) to the two braking positions on both sides, a braking effect is also possible in the reverse external force direction. To this end, the present cam disc 5 has two cams.

The invention claimed is:

1. An embarking or disembarking device for a vehicle, the device comprising:
an extension configured to move back and forth between a retracted and an extended position, a driven carrier which carries the extension, a motor and an associated gearing mechanism to drive the carrier, braking means to at least brake the extension,
wherein the extension is mounted in a movable manner relative to the carrier, and the braking means are moved at least from their release position to their braking position by means of the relative movement between the extension and the carrier.

2. The embarking or disembarking device according to claim 1, wherein the braking means are moved into their release position by means of a restoring force.

3. The embarking or disembarking device according to claim 1, wherein the relative movement of the extension and the carrier is configured in such a manner that a central release position and two braking positions corresponding to the two movement directions of the relative movement are provided.

4. The embarking or disembarking device according to claim 1, wherein the gearing mechanism has a form-fitting or force-fitting, preferably form-fitting belt or chain drive.

5. The embarking or disembarking device according to claim 1, wherein the carrier is fastened to a belt of the belt drive.

6. The embarking or disembarking device according to claim 1, wherein the braking means comprise a cam disc which is mounted on the extension and interacts with the carrier to generate a braking force.

7. The embarking or disembarking device according to claim 1, wherein the motor is an electric motor, a hydraulic motor or a pneumatic motor.

8. The embarking or disembarking device according to claim 1, wherein the braking means interact with a friction face.

9. The embarking or disembarking device according to claim 1, wherein the extension is mounted in a linearly displaceable manner.

10. The embarking or disembarking device according to claim 1, wherein the position of the braking means is detected by means of an optical, magnetic or electromechanical sensor.

11. A passenger-carrying vehicle comprising an embarking or disembarking device according to claim 1.

* * * * *